(12) United States Patent
Shimpuku et al.

(10) Patent No.: US 6,284,831 B1
(45) Date of Patent: *Sep. 4, 2001

(54) FIBER-REINFORCED RESIN MOLDED ARTICLE

(75) Inventors: Takashi Shimpuku, Ichibara; Mnoru Toyama, Kimitsu, both of (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/964,894

(22) Filed: Nov. 5, 1997

(30) Foreign Application Priority Data

Nov. 7, 1996 (JP) .................................................. 8-311311

(51) Int. Cl.[7] ................................. C08J 5/10; C08K 3/40; C08L 23/00
(52) U.S. Cl. ............................ 524/494; 524/492; 524/493
(58) Field of Search .................................... 524/492, 493, 524/494; 523/220

(56) References Cited

U.S. PATENT DOCUMENTS 5,792,527 * 8/1998 Yoshimitsu et al. ................ 428/36.1

FOREIGN PATENT DOCUMENTS

| 0056703 | 7/1982 | (EP) . |
| 0170245 | 2/1986 | (EP) . |
| 61040359 | 2/1986 | (JP) . |
| 01241406 | 9/1989 | (JP) . |

* cited by examiner

Primary Examiner—James J. Seidleck
Assistant Examiner—U. K. Rajguru
(74) Attorney, Agent, or Firm—Leydig, Voit & Mayer, Ltd.

(57) ABSTRACT

Disclosed is a fiber reinforcement-containing polyolefin composition comprising a polyolefin resin component containing a graft modified polyolefin and/or an ionomer; a long fiber reinforcement having an average fiber diameter of 3 to 21 μm, of which fibers are arranged and dispersed in a pellet having a length of 3 to 30 mm prepared by molding the polyolfin resin component, in nearly parallel with each other; and a short fiber reinforcement having an average fiber length of 0.1 to 2 mm and an average fiber diameter of 3 to 21 μm, which is wholly dispersed at random; wherein the polyolefin resin component, long fiber reinforcement and short fiber reinforcement are contained in a specific amount, respectively. According to the fiber reinforcement-containing polyolefin composition of the present invention, there can be provided a fiber-reinforced resin molded article which is superior in tensile strength and fastening breaking torque strength as well as strength of the thin-wall portion and mold structure transferring property of the fine structure portion.

4 Claims, 3 Drawing Sheets

FIBER-REINFORCED RESIN MOLDED ARTICLE

TECHNICAL FIELD OF THE INVENTION

The present invention relates to a fiber reinforcement-containing polyolefin composition (normally, a mixture of pellets) mainly composed of a long fiber reinforcement, a short fiber reinforcement and a polyolefin at least partially modified.

The present invention also relates to a fiber-reinforced resin molded article which is produced by molding this fiber reinforcement-containing polyolefin composition into a predetermined shape. More particularly, the present invention relates to a fiber-reinforced resin molded article which is produced by mainly using the above fiber reinforcement-containing polyolefin composition, and molding the composition into a shape whose surface is provided with any one of a threaded projection, a bayonet projection, an arcuate projection, a linear projection, a columnar projection and a dot-shaped projection.

TECHNICAL BACKGROUND OF THE INVENTION

Excellent mechanical strength and high reliability are required in structures to which a large load is applied, such as mechanical devices, frames (e.g. pipe rack, cable rack, etc.) and construction structures (e.g. architectural structure, bridge, etc.). Accordingly, excellent mechanical strength and high reliability are also required of members constituting these structures such as mechanical devices, frames, construction structures, etc. so that they do not break.

Examples of the member, which is often used for constituting these structures, include fastening members such as a mechanical screw, a bolt with male screw threads and nut with a female screw (referred to as "bolt nut"). The mechanical screw threads or bolt should to be superior in strength in the thin-wall portion (edge) of the screw thread having a shape which is easily broken, and should to have excellent tensile strength and excellent strength against fastening (i.e. high breaking torque) in order to endure an outer force applied to the head portion. In order to satisfy the requirements, metals such as steel, etc. have hitherto been used as a material for the fastening member such as a mechanical screw, a bolt nut, etc.

However, changing the material of the member (e.g. screw, bolt, etc.) from metal to resin has recently been made in view of lightening and/or chemical resistance. As the resin, a vinyl chloride (PVC) resin and a polycarbonate (PC) resin have been proposed.

However, since the PVC resin and PC resin themselves are inferior in mechanical strength, problems such as breakage, tearing, snapping, etc. arise when an excess outer force is applied to a molded article made of these resins. For example, in case of the resin bolt, problems such as breakage due to fastening torque (rupture), breakage of threaded thin-wall portion (edge) and breakage or break-off of a bolt head are liable to arise.

Therefore, for the purpose of improving the mechanical strength of these resin products, a fiber-reinforced resin molded article prepared by molding a composition of a resin and a fiber reinforcement such as glass fibers, etc. has already been suggested.

The fiber-reinforced resin molded article can be roughly classified into a short fiber-reinforced resin molded article and a long fiber-reinforced resin molded article.

The mechanical strength of the fiber-reinforced resin molded article is largely influenced by the affinity of the resin and fiber reinforcement to be mixed. That is, in the combination in which the affinity between the resin and fiber reinforcement is good, the fibers used as the reinforcement are uniformly dispersed in the resin and are also adhered strongly at the whole interface region with the resin and, therefore, an improvement in mechanical strength of the fiber-reinforced resin molded article is realized.

In the short fiber-reinforced resin molded article, the fibers as the reinforcement are easily dispersed in the resin because the fiber reinforcement is easily mixed with the resin due to the shortness of the fibers. Accordingly, the short fiber-reinforced resin molded article has a preferable feature, e.g. improvement of the local mechanical strength of the resulting member occurs because the short fibers fill in (spread over) the thin-wall portion (minute portion).

However, the short fiber-reinforced resin molded article often does not have enough mechanical strength to endure in applications where a large load is applied to the whole molded article, because the fibers are short. That is, the short fiber-reinforced resin molded article had a problem that, when applied to applications to where particularly excellent mechanical strength is required (e.g. fastening member described above, etc.), the mechanical strength (e.g. tensile strength, fastening breaking torque strength, etc.) does not reach a required level.

In case of the long fiber-reinforced resin molded article, the mechanical strength is influenced by the orientation state of the long fibers. Specifically, the mechanical strength of the fiber-reinforced resin molded article is high along with the orientation direction of the blended long fibers and is remarkably improved by uniformly arranging the long fibers.

Accordingly, the mechanical strength of the whole long fiber-reinforced resin molded article can be improved sufficiently because the formulated fibers as the reinforcement are long. However, when the fiber reinforcement is long, the fiber reinforcement can accumulate in the state similar to an integrated material (roving) and, therefore, it is not easily uniformly mixed with the resin. As a result, there often arises a problem that the long fiber-reinforced resin molded article is inferior in mold shape retention, locally (particularly, thin-wall portion, fine structure portion, etc.) and the mechanical strength is not sufficient.

Japanese Patent Kokoku Publication No. Hei 3-25340 (25340/91) discloses a fiber reinforcement-containing resin composition comprising a thermoplastic resin and long fibers, wherein a poor physical affinity of the long fibers and resin is improved.

In this fiber reinforcement-containing resin composition, the physical wetting property (affinity) of the resin for the fiber reinforcement is improved by blending a fiber-reinforced pellet, prepared by arranging reinforcing filaments (fibers) in a low-molecular weight thermoplastic resin in parallel with each other, with a thermoplastic resin having a molecular weight higher than that of the above thermoplastic resin. As a result, the fiber-reinforced resin molded article obtained from this long fiber-reinforced resin composition has sufficient mechanical strength at the portion other than thin-wall portion. However, this fiber-reinforced resin molded article still has a because that the long fiber is not filled in the thin-wall portion such as threaded portion (edge portion) and the mechanical strength of the thin-wall portion is low and, furthermore, the mold shape transferring property at the fine structure portion is poor, because the formulated fibers as the reinforcement are long.

Furthermore, the long fiber-reinforced resin molded article also had a problem that the long fiber is liable to be snapped in the production, particularly in case of melt-kneading the long fiber reinforcement-containing resin pellet and, as a result, the mechanical strength is liable to become lower than an expected value.

In order to solve these problems, a process for the production of a long fiber-reinforced thermoplastic resin composition, wherein the long fibers are prevented from snapping by blending a long fiber reinforcement-containing thermoplastic resin and a thermoplastic resin containing no long fiber, has already been proposed (Japanese Patent Kokai Publication No. Hei 1-241406). According to this process, the fiber-reinforced resin molded article obtained from the composition containing the long fibers as the reinforcement has excellent mechanical strength because the long fibers as the reinforcement in the long fiber reinforcement-containing composition are not easily snapped.

However, even in case of this fiber-reinforced resin molded article, the fibers as the reinforcement do not sufficiently fill the thin-wall and fine structure portion such as a thread, etc. because the fiber reinforcement is composed of the long fibers. Therefore, there still remains a problem that the mechanical strength of thin-wall and fine structure portion is not sufficiently improved and the mold shape transferring property is low.

On the other hand, a fiber-reinforced resin molded article prepared by mixing a combination of short glass fibers and long glass fibers with a resin has already been disclosed (Japanese Patent Kokoku Publication No. Hei 4-65854). This fiber-reinforced resin molded article is a glass fiber-reinforced resin sheet obtained by impregnating a long glass fiber reinforcement mat with a thermoplastic resin (polypropylene) containing a short glass fiber reinforcement, thereby formulating the short glass fibers and long glass fibers in a specific ratio. This fiber-reinforced resin molded article can be formed into a sheet-like stamping molded article (compressed molded article) having excellent strength even in the detail portion by allowing the short glass fibers to spread over the detail portion while maintaining the mechanical strength due to the long glass fiber reinforcement.

However, the shape of this fiber-reinforced resin molded article is limited to a flat shape (e.g. sheet, etc.), which can be stamped, in view of its production process, and it is difficult to make a product having a three-dimensional shape, such as a screw, bolt, etc. In this fiber-reinforced resin molded article, it is most difficult to arrange long glass fibers as the reinforcement constituting the mat in a longitudinal direction of a screw, bolt, etc.

Accordingly, this fiber-reinforced resin molded article could hardly applied to the development of fastening members such as a screw, bolt, etc. which are required to sufficiently satisfy the requirements to the tensile strength and fastening breaking torque strength as well as strength of the thin-wall portion and mold shape transferring property of the fine structure part because it is used under severe conditions.

The first object of the present invention is to solve various problems accompanied with the above prior art as a whole and to provide for a fiber reinforcement-containing polyolefin composition capable of providing for a fiber-reinforced resin molded article which is superior in tensile strength and fastening breaking torque strength as well as strength of the thin-wall portion and mold structure transferring property of the fine structure portion.

The second object of the present invention is to provide for a bar-like molded article formed of the fiber reinforcement-containing polyolefin composition, particularly various bolts. The bolts according to the present invention include a "single-end bolt" provided with a screw thread at one end, a "double-end bolt" provided with a screw thread at both ends and a "continuous-thread bolt" provided with a screw thread over the whole length.

SUMMARY OF THE INVENTION

The fiber reinforcement-containing polyolefin composition comprises:

a polyolefin resin component containing at least one modified polyolefin selected from the group consisting of a graft-modified polyolefin and an ionomer, said graft-modified polyolefin being prepared by modifying an unmodified polyolefin with at least one modifier selected from the group consisting of an organosilane compound, an unsaturated carboxylic acid and an unsaturated carboxylic anhydride;

a long fiber reinforcement composed of long nearly parallel fibers having an average fiber diameter of 3 to 21 $\mu$m, said long fibers being arranged and dispersed in a pellet having a length of 3 to 30 mm prepared by molding the polyolefin resin component; and a short fiber reinforcement composed of short fibers having an average fiber length of 0.1 to 2 mm and an average fiber diameter of 3 to 21 $\mu$m, said short fibers being wholly dispersed at random; wherein the polyolefin resin component, the long fiber reinforcement and the short fiber reinforcement are contained in an amount of 20 to 90% by weight, 5 to 76% by weight and 0.5 to 40% by weight, respectively;

the weight ratio of the long fiber reinforcement to the short fiber reinforcement is within the range from 1/1 to 19/1; and the weight ratio of the polyolefin resin component to the total weight of the long and short fiber reinforcements is within the range from 1/0.25 to 1/9.

The fiber-reinforced resin molded article of the present invention is characterized by molding the fiber reinforcement-containing polyolefin composition.

DETAILED DESCRIPTION

Figure 1:
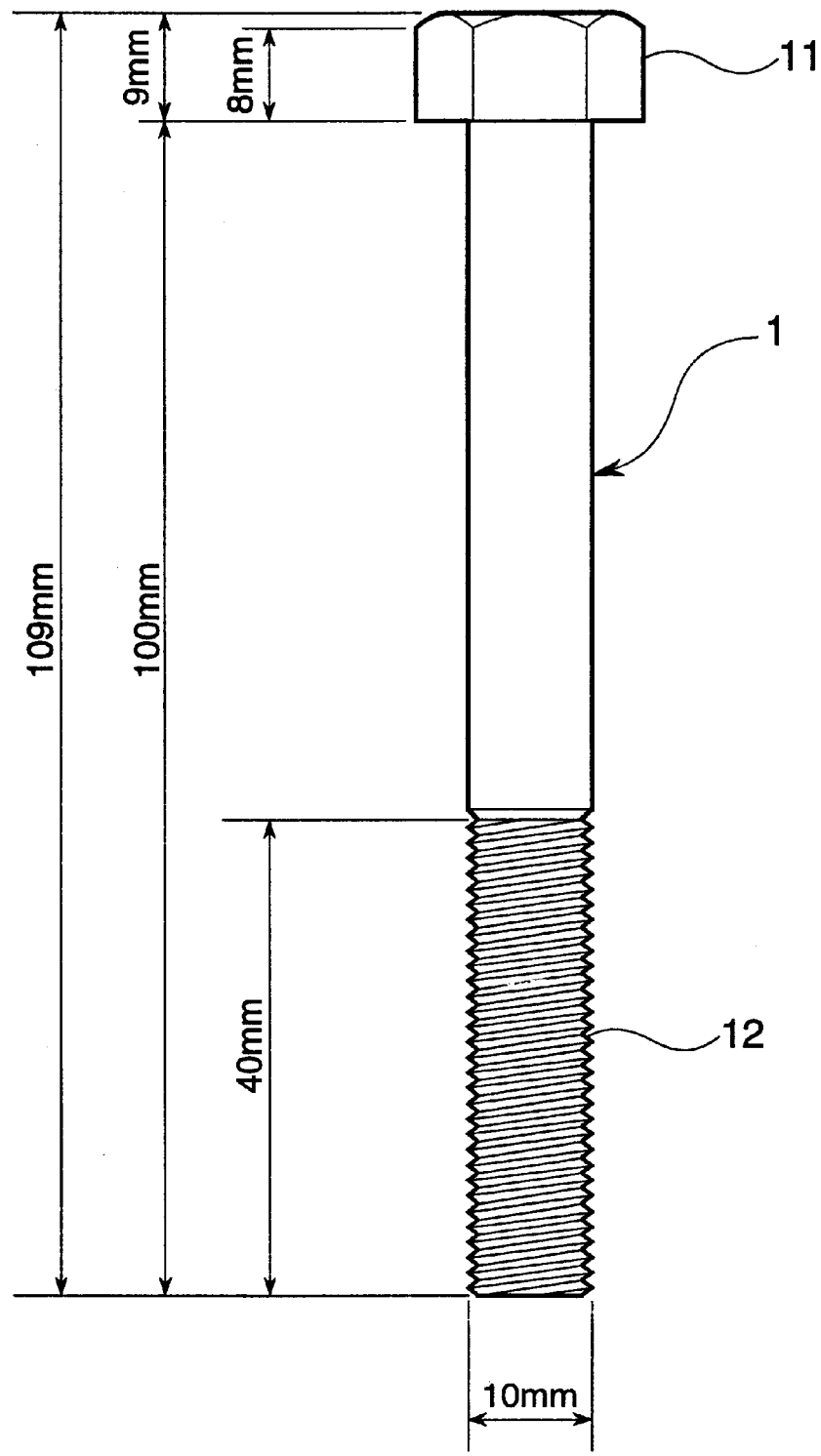
FIG. 1 is a side view of an M10 bolt (fiber-reinforced polypropylene molded article).

The practical embodiments of the present invention will be described in detail hereinafter.

The fiber reinforcement-containing polyolefin composition of the present invention comprises a specific long fiber reinforcement, a specific short fiber reinforcement and a specific polyolefin resin component.

Among these essential components, the polyolefin resin component will be described, first.

<Resin Component>

The polyolefin resin component used in the fiber reinforcement-containing polyolefin composition contains a modified polyolefin.

Examples of the modified polyolefin include a graft modified polyolefin, and ionomer which is an ionic polymer.

The graft modified polyolefin is a polymer grafted with a modifier to a molecular backbone of an unmodified polyolefin. Examples of the unmodified polyolefin used in the production of the graft modified polyolefin include crystalline homopolymer, crystalline copolymer, and a composition of the crystalline homopolymer and crystalline copolymer.

Examples of the monomer used in the production of the unmodified polyolefin include an α-olefin having 2 to 10 carbon atoms, preferably from 2 to 6 carbon atoms.

Examples of the α-olefin having 2 to 10 carbon atoms include ethylene, propylene, 1-butene, 1-pentene, 1-hexene, 4-methyl-1-pentene, 1-octene, 1-decene and the like. Among them, ethylene, propylene and 4-methyl-1-pentene are preferable in view of the practical use. Propylene is particularly preferable.

It is a polymer mainly composed of ethylene, which is extremely superior in low-temperature resistance (cold resistance), and an ethylene polymer eludes all attempts at imitation in the low-temperature application.

It is a polyolefin mainly composed of 4-methyl-1-pentene, which is markedly superior in heat resistance and resistant to disinfection in an oven (sterilization, 121° C.×20 min.), and the kind of the polyolefin selected varies depending on the application.

The modifier used in the graft modification of the unmodified polyolefin is at least one selected from the group consisting of an organosilane compound, an unsaturated carboxylic acid, and an unsaturated carboxylic anhydride.

Examples of the organosilane compounds include aminosilane, epoxysilane, vinylsilane, methacryloxysilane and the like. The organosilane compounds can be used singly, or in any combination thereof.

Examples of the unsaturated carboxylic acids include acrylic acid, methacrylic acid, maleic acid, itaconic acid, tetrahydrophthalic acid, norborenedicarboxylic acid and the like. The unsaturated carboxylic acid used in the present invention also includes its derivative, for example, acid anhydride, acid halide, acid amide and the like.

Examples of the unsaturated carboxylic anhydride include maleic anhydride, itaconic anhydride, tetrahydrophthalic anhydride, norbornenedicarboxylic anhydride and the like.

These unsaturated carboxylic acids and unsaturated carboxylic anhydrides may be used alone, or a plurality of the unsaturated carboxylic acids, a plurality of the unsaturated carboxylic anhydrides or the unsaturated carboxylic acids and unsaturated carboxylic anhydrides may be used in combination.

Among these modifiers, the unsaturated carboxylic acid or anhydride thereof may be used. Maleic acid or maleic anhydride is preferable, and maleic anhydride is particularly preferable. The advantage of maleic anhydride is that it hardly forms a polymer in the graft reaction system and grafts at each point of a backbone polymer in the form of a monomer unit. This fact has already been confirmed by $C^{13}$-NMR analysis.

The modifier is desirably contained in the unmodified polyolefin in an amount of 0.01 to 5% by weight, preferably from 0.05 to 1% by weight, based on the weight of the fiber reinforcement-containing polyolefin composition.

When the amount of the modifier used is less than 0.01% by weight, the effect of modification, that is, effect of improvement in dispersion of the fiber reinforcement into the resin is too small. On the other hand, when the amount of the modifier used exceeds 5% by weight, the effect of the modifier does not increase in proportion to the amount and tackiness sometimes arises in the graft modified polyolefin.

The graft modified polyolefin can be produced by mixing the unmodified polyolefin with at least one selected from the group consisting of the organosilane compound, unsaturated carboxylic acid and unsaturated carboxylic anhydride as the modifier in a mixing means such as a Henschel mixer (trade name), etc., and introducing the resulting mixture into an extruder to melt-knead it. In this case, organic peroxides and/or lubricants may be further blended in the mixture of the unmodified polyolefin and modifier so as to control the molecular weight of the resulting modified polyolefin and to improve the fluidity in the extruder.

Similar to the graft modified polyolefin, the ionomer which can be used as the modified polyolefin in the present invention can be obtained by polymerizing the above α-olefin, particularly ethylene, with a (meth)acrylate as the modifier.

The (meth)acrylate used as the modifier in the preparation of the ionomer is a salt of (meth)acrylic acid and an alkaline metal ion or an alkaline earth metal ion, but it may be a salt of (meth)acrylic acid and an ammonium ion.

Examples of the alkaline metal ion include ions of sodium and potassium, and examples of the alkaline earth metal ion include ions of calcium and zinc. These acrylates containing a cation may be used alone or in combination thereof.

The resin component contained in the fiber reinforcement-containing polyolefin composition of the present invention may have the above unmodified polyolefin, in addition to the modified polyolefin.

The resin component preferably contains, based on 100 parts by weight of the resin component, 0.5 to 100 parts by weight, preferably from 5 to 80 parts by weight, of the modified polyolefin and 0 to 99.5 parts by weight, preferably from 20 to 95 parts by weight, of the unmodified polyolefin. When the amount of the unmodified polyolefin in the resin component exceeds the above range, the fiber reinforcement may not be uniformly dispersed in the molded article.

The fiber reinforcement-containing polyolefin composition of the present invention contains a long fiber reinforcement and a short fiber reinforcement, in addition to the above resin component.

In the composition of the present invention, the long fiber reinforcement is contained as a long fiber reinforcement-containing polyolefin pellet containing at least one portion of the above resin component. Consequently, the long fiber reinforcement and short fiber reinforcement organically accomplish a cooperative function (synergistic function) in the molded article obtained from the composition of the present invention.

Specifically, the cooperative function means that the long fiber reinforcement exclusively serves as a structural material and the short reinforcement serves as a reinforcement for a detailed portion (minute portion).

The fiber reinforcement-containing polyolefin composition of the present invention is composed of the long fiber reinforcement-containing polyolefin pellet, the remainder of the resin component and the short fiber reinforcement, and the remainder of the resin component and short fiber reinforcement are preferably contained as the short fiber reinforcement-containing polyolefin pellet.

That is, the composition of the present invention is preferably a mixture of the long fiber reinforcement-containing pellet and short fiber reinforcement-containing pellet.

Examples of these long fiber reinforcement-containing pellet and short fiber reinforcement-containing pellet include the followings:

(a) pellet of modified polyolefin containing long fiber reinforcement;
(b) pellet of composition of modified polyolefin and unmodified polyolefin, containing long fiber reinforcement;
(c) pellet of modified polyolefin containing short fiber reinforcement; and
(d) pellet of composition of modified polyolefin and unmodified polyolefin, containing short fiber reinforcement.

Each fiber reinforcement will be described in detail hereinafter.

<Long Fiber Reinforcement>

The long fiber reinforcement used in the fiber reinforcement-containing polyolefin composition of the present invention is composed of single fibers having an average diameter of 3 to 21 μm, preferably from 9 to 21 μm.

When the average diameter of the long fibers as the reinforcement is not more than 1 μm, the fibers as the reinforcement is liable to be broken on molding and the resulting molded article lacks impact strength. On the other hand, when the average diameter of the fibers as the reinforcement is not less than 23 μm, the molded article sometimes has an inferior appearance and lacks mechanical strength.

The long fiber reinforcement used in the present invention is contained in the composition as a pellet obtained by impregnating continuous fibers with a resin, followed by drawing and further cutting. This pellet has a pellet length of 3 to 30 mm, preferably from 5 to 25 mm. Accordingly, the length of the long fiber reinforcement (long fibers) is the same as the pellet length.

When the average fiber length of the long fiber reinforcement is not more than 1 mm, the long fiber reinforcement is too short and, therefore, the mechanical strength of the molded article can not be improved. On the other hand, when the average fiber length of the long fiber reinforcement exceeds 40 mm, the long fiber reinforcement is too long and it becomes difficult to uniformly disperse the fibers in the molded article and, therefore, a molded article having good appearance is hardly obtained.

In order to produce a pellet containing the long fiber reinforcement, the long fiber reinforcement may be used as an integrated material prepared by integrating about 500 to 4000 single fibers (hereinafter referred to as "roving", sometimes), or may be used in the form that two or more rovings are combined.

The long fiber reinforcement may be one or more inorganic fibers, one or more organic fibers, or a mixture of them, and the kind may be appropriately selected according to the condition on use.

Examples of the inorganic fiber include artificial fibers such as glass fiber, carbon fiber, molten quartz fiber, rock wool fiber and metallic fiber.

Among them, a glass fiber is exclusively used because of excellent balance between physical and economical properties. The "glass" used herein is a general term of a metallic salt of a silicic acid (metal silicate), and specific examples thereof include alkaline metal silicate and metal borosilicate.

It is a hard glass such as potash glass, etc., which is preferable as the glass fiber, and more preferable one is E glass as a non-alkaline glass. A borosilicate glass acknowledged as a heat-resistant glass is excellent because the degree of deterioration of physical properties is remarkably small under the condition on use at comparatively high temperature.

The carbon fiber is by far useful for applications where lightweight properties and strength are considered to be important, e.g. aircraft, etc., because of excellent specific strength.

The inorganic fiber may be used as the long fiber reinforcement or short fiber reinforcement after treating the surface with a surface treatment agent such as silane coupling agent, titanate coupling agent, boron coupling agent, aluminate coupling agent, zirco-aluminate coupling agent and the like. By subjecting the inorganic fiber to a surface treatment agent for enhancing the affinity to the polyolefin, the polyolefin is easily penetrated into a gap between the fiber reinforcements.

Examples of the organic fiber include polyamide fiber, semi-aromatic polyester fiber, all-aromatic polyester fiber and the like.

Specific examples of the polyamide fiber include ring opening polymerization type polyamide resin fiber such as fibers of 6-nylon, 7-nylon, 11-nylon, 12-nylon, etc.; co-condensed polyamide resin fibers such as fibers of 6,6-nylon, 6,7-nylon, 6,10-nylon, 6,12-nylon, 6-/6,6-co-condensed nylon, etc.; semi-aromatic polyamide fiber such as fibers of nylon MXD6 (co-condensate of m-xylylenediamine and adipic acid); and all-aromatic polyamide (another name: Aramid, trade name: Kevlar) fiber. These polyamide fibers are preferable because of excellent mechanical strength. The semi-aromatic polyamide fiber and aromatic polyamide fiber are particularly suitable for applications where the mechanical strength and heat resistance are required because of their excellent mechanical strength and heat resistance.

Examples of the semi-aromatic polyester fiber include polyethylene terephthalate (PET) fiber, poly-1,4-butylene terephthalate (PBT) fiber and the like. These semi-aromatic polyester fiber and aromatic polyester fiber are particularly suitable for applications where the mechanical strength and heat resistance are required because of their excellent mechanical strength and heat resistance.

The long fiber reinforcement composed of the fibers as described above is preferably formed into a long fiber reinforcement-containing pellet by a "drawing method". In this drawing method, a molten resin component is fed from an extruder to an opening impregnation device provided at the downstream side of the extruder and, at the same time, a long fiber reinforcement is introduced in the form of an integrated material, e.g. roving, etc. from the upstream side of the opening impregnation device, and the long fiber reinforcement is impregnated with the resin component while opening the long fiber reinforcement every single fiber, intermediate opened material, etc. in the device and then the resin is solidified by cooling.

In this case, the opening of the long fiber reinforcement is conducted by making the integrated fibers, which are introduced from the upstream side of the device, contact with opening means provided in the opening impregnation device, e.g. members such as a plurality of opening pins, opening rolls, etc. to change their running direction, or pass the long fibers between any couple of the members in order to form a gap between the long fibers of the reinforcement. The molten resin component is sufficiently penetrated into the gap between the fibers formed by the opening and, at the stage where the fiber reinforcement is impregnated with a predetermined resin component, the impregnated material is drawn in the form of a reinforced strand from a forming nozzle (shaping orifice) provided at the downstream end of the fiber impregnation device. According to such drawing, a continuous resin molded article (resin/long fiber complex)

containing a continuous long fiber reinforcement, which has a desired diameter and/or a cross section, can be obtained by selecting a proper forming nozzle and drawing conditions.

The pellet containing the long fiber reinforcement can be produced by cutting a continuous long fiber reinforcement-containing continuous resin molded article, wherein the continuous fibers, particularly the rovings are impregnated with a resin component in a molten state, as described above. The resulting long fiber reinforcement-containing pellet has a shape of being stretched along a fixed direction (melt flow direction of resin), such as of columnar article, etc.

According to the composition of the present invention, since such a long fiber reinforcement-containing pellet is used, the product shows not only excellent compression strength and tensile strength, but also excellent strength to bending.

<Short Fiber Reinforcement>

The short fiber reinforcement used in the fiber reinforcement-containing polyolefin composition of the present invention is composed of short fibers having an average fiber length of 0.2 to 2 mm, preferably from 0.4 to 1.0 mm, and an average diameter of 3 to 21 µm, preferably from 9 to 21 µm, and is normally commercially available in the form of a chopped strand.

When the average fiber length of the short fiber reinforcement is not more than 0.05 mm, the mechanical strength of the resulting molded article does not reach an expected level. On the other hand, when the average fiber length of the fiber reinforcement exceeds 4 mm, the short fibers as the reinforcement do not easily fill the thin-wall portion or fine structure portion of the molded article. Therefore, it becomes impossible to impart the desired strength to the thin-wall portion of the molded article and the mold transferring property of the fine structure portion is deteriorated, regardless of formulation of the short fiber reinforcement.

When the average diameter of the short fibers as the reinforcement is not more than 1 µm, the short fibers as the reinforcement are liable to be broken on molding and the resulting molded article is liable to lack in impact strength. To the contrary, when the average diameter of the short fibers as the reinforcement is not less than 23 µm, deterioration of the appearance of the molded article often arises and the molded article is liable to lack mechanical strength.

The short fiber reinforcement may be fibers composed of the materials described for the long fiber reinforcement and may be one or more of inorganic fibers, one or more organic fibers and a mixture of them, and the kind may be appropriately selected according to the conditions on use. Among them, an inorganic fiber is preferably used, particularly glass fiber.

In the fiber reinforcement-containing polyolefin composition of the present invention, the short fibers as the reinforcement may be random (in longitudinal direction and dispersion) in the whole composition, and are not necessarily uniformly dispersed, Accordingly, the composition of the present invention may include the short fiber reinforcement, but preferably contains a pellet composed of the short fiber reinforcement and resin component, the short fibers as the reinforcement being dispersed at random.

The pellet of the short fiber reinforcement can be produced, for example, by charging the resin component (may be composition of the modified polyolefin and the unmodified polyolefin) and short fiber reinforcement through a raw material feed hopper of an extruder, kneading the resin component in a molten state with the short fiber reinforcement, drawing a strand of a resin/short fiber complex through a shaping orifice of the extruder, and cutting the strand into pieces having a predetermined length.

According to the composition of the present invention, the short fiber reinforcement described above is used. Therefore, regarding the thin-wall portion and fine structure portion of the resulting molded article, the strength and mold shape transferring property are improved by the short fibers as the reinforcement filled in the composition, preferentially.

The fiber reinforcement-containing polyolefin composition of the present invention comprises the above described long fiber reinforcement-containing polyolefin pellet with the remainder of the resin component and short fiber reinforcement (preferably, those in the form of the short fiber reinforcement-containing polyolefin pellet).

By only mixing the long fiber reinforcement-containing polyolefin pellet with the short fiber reinforcement-containing polyolefin pellet so that the weight ratios of the resin component, the long fiber reinforcement and the short fiber reinforcement as the constituent components become a predetermined value, the fiber reinforcement-containing polyolefin composition can be produced, easily and practically.

For example, the fiber reinforcement-containing polyolefin composition of the present invention can be produced by blending the long fiber reinforcement-containing polyolefin pellet with the short fiber reinforcement-containing polyolefin pellet, using a tumbler mixer.

The composition of the present invention thus prepared finally contains the above resin component in the amount of 20 to 90% by weight, preferably from 40 to 80% by weight.

In the composition of the present invention, an expected performance is exerted in almost all of cases if the weight ratio of the long fiber reinforcement to the short reinforcement material is normally from 1/1 to 19/1 (the former/the latter), preferably from 2.3/1 to 10/1. When the weight ratio of the long fiber reinforcement to the short fiber reinforcement material is not more than 0.5/1 (the former/the latter), the degree of the improvement in various physical properties such as tensile strength, flexural strength, flexural rigidity and heat resistance of the resulting fiber-reinforced resin molded article is small.

When the weight ratio of the long fiber reinforcement to the short reinforcement is not less than 25/1 (the former/the latter), the mechanical strength of the thin-wall portion does not reach the expected level. The reason is considered as follows. That is, the short fibers as the reinforcement hardly fill in the thin-wall portion.

In the composition of the present invention, the weight ratio of the total of the long fiber reinforcement and short reinforcement to the resin component is from 1/0.25 to 1/9 (the former/the latter), preferably from 1/0.7 to 1/4. When the weight ratio of the total of the long fiber reinforcement and short reinforcement to the resin component is not less than 1/0.20 (the former/the latter), the moldability of the composition is not suitable for practical use and the appearance of the resulting fiber-reinforced resin molded article becomes poor.

When the weight ratio of the total of the long fiber reinforcement and short reinforcement to the resin component is not more than 1/11 (the former/the latter), the effect for improvement of various physical properties such as tensile strength, flexural strength, rigidity and heat resistance of the resulting fiber-reinforced resin molded article become small.

As is apparent from the weight ratio of the short fiber reinforcement to the long fiber reinforcement and the weight ratio of the total of the long fiber reinforcement and short fiber reinforcement to the resin component within the above ranges, the fiber reinforcement-containing polyolefin composition of the present invention contains 5 to 76% by weight of the long fiber reinforcement and 0.5 to 40% by weight of the short fiber reinforcement.

It is possible to further add the above inorganic fillers or organic fillers surface-treated with various additives which are ordinarily added to the polyolefin resin, for example, antioxidants, metal deactivators, photostabilizers, organic peroxides, flame retardants, inorganic pigments, organic pigments, clarifiers, nucleators, lubricants, static agents, antifogging agents, antiblocking agents, metal soaps, inorganic fillers (e.g. talc, mica, calcium carbonate, magnesium hydroxide, aluminum hydroxide, etc.), the inorganic fillers treated with coupling agents (e.g. silane coupling agent, titanate coupling agent, boron coupling agent, aluminate coupling agent, zircoaluminate coupling agent, etc.) or organic fillers unless the object of the present invention is adversely affected.

The fiber-reinforced resin molded article of the present invention is produced by molding the above described fiber reinforcement-containing polyolefin composition into any shape.

The production of the fiber-reinforced resin molded article of the present invention can be conducted by using a suitable method such as extrusion molding, compression molding, injection molding and the like. A comparatively flat molded article such as sheet-like article can be obtained from the composition of the present invention, for example, by extrusion molding.

The amount of the modified polyolefin and unmodified polyolefin as the resin component as well as the long fiber reinforcement and short fiber reinforcement, which are contained in the fiber reinforcement-containing polyolefin composition, may be appropriately selected within the above range according to characteristics required to the resulting molded article.

The fiber reinforcement-containing resin molded article of the present invention is superior in tensile strength, fastening breaking torque strength and strength of the thin-wall portion, and is particularly suitable for a molded article provided with a bar-like body and a projection portion for engagement formed on the surface of the body.

Examples of the projection for engagement include a thread projection, a bayonet projection, an arcuate projection, a linear projection, a columnar projection, a dot-shaped projection and the like.

More specifically, the fiber-reinforced resin molded article of the present invention is particularly preferable as various bolts, for example, screws, bolts, etc. prepared by injection molding. The "bolt" used herein includes "single-end bolt" provided with a screw thread at one end, "double-end bolt" provided with a screw thread at both ends and "continuous-thread bolt" provided with a screw thread over the whole length thereof, and the shape of these bolts is defined in JIS (Japanese Industrial Standard).

According to the fiber reinforcement-containing polyolefin composition of the present invention, there can be provided a fiber-reinforced resin molded article which is superior in tensile strength and fastening breaking torque strength as well as strength of the thin-wall portion and mold shape transferring property of the fine structure portion.

The fiber-reinforced resin molded article of the present invention is superior in tensile strength and fastening breaking torque strength as well as strength of the thin-wall portion and mold shape transfer property of the fine structure portion, and is suitable as a bar-like molded article, particularly various bolts.

EXAMPLES

The following Examples and Comparative Examples further illustrate the present invention in detail but are not to be construed to limit the scope thereof.

In the Examples and Comparative Examples, an M10 bolt was made by injection molding, respectively, using the produced composition. This M10 bolt is provided with a head portion 11 formed at one end of a bar-like body 1, and a male screw thread 12 from the end opposite the head portion 11 of the body 1 to the center portion.

An M10 bolt obtained by standing at 23° C. for 48 hours after the completion of injection molding was subjected to various tests for evaluation, e.g. moldability and glass short fiber reinforcement filling property of the thin-wall portion (thread) of the bolt, screw fastening breaking torque strength, tensile breaking strength, and the presence/absence of phenomenon of bolt head break-off.

(1) Evaluation of Moldability of Thin-wall Portion and Filling Property of Glass Short Fiber Reinforcement A photograph of a soft X-ray image of the thread of the resulting M10 bolt was taken. The shape of the thread tip portion of the bolt was visually observed from an enlarged image obtained by enlarging/printing the resulting negative of the thread, and the moldability and filling state of the glass short fiber reinforcement were evaluated from the visually observed shape. The evaluation criteria are shown below.

A (good): It shows the state where the glass short fiber reinforcement fills up to the thread tip portion and formation of the thread is good.

B (slightly poor): It shows the state where filling by the glass short fiber reinforcement at the thread tip portion is slightly insufficient and formation of the thread is insufficient.

C (poor): It shows the state where filling by the glass short fiber reinforcement at the thread tip portion is insufficient and, therefore, formation of the thread is insufficient.

(2) Measurement of Screw Fastening Breaking Torque Strength of M10 Bolt

Figure 2:
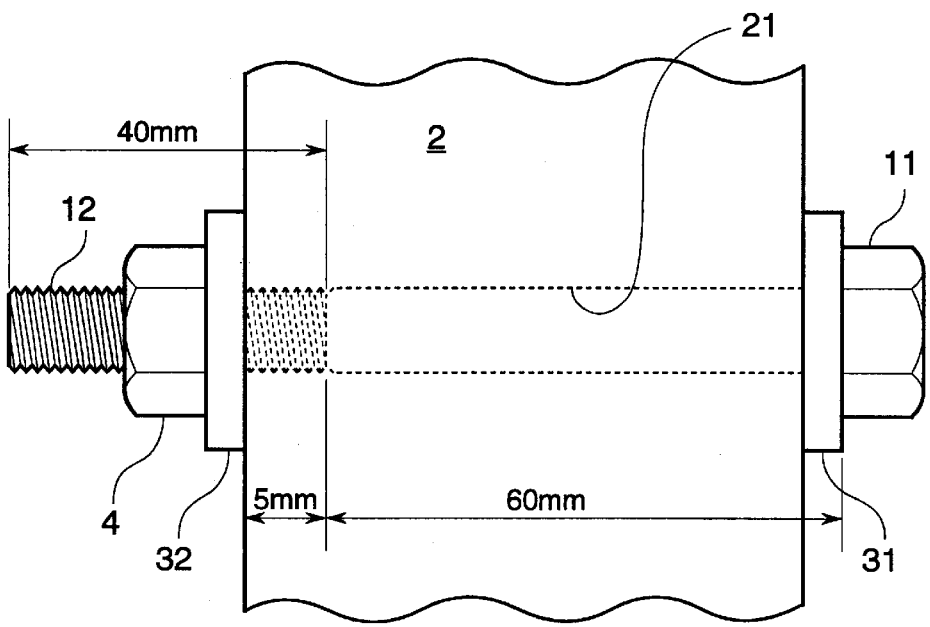
FIG. 2 is a partially schematic sectional view of a test jig used in the measurement of the screw fastening breaking torque strength of an M10 bolt in Examples and Comparative Examples.

A screw fastening breaking torque strength of the M10 bolt was measured by using a jig shown in FIG. 2. In FIG. 2, 2 is an aluminum block. A M10 bolt passed through a washer 31 is inserted into a hole 21 for inserting a bolt (65 mm in length) from one side, and a screw portion 12 opposite to a head portion 11 protrudes at the other side. A nut 4 is screwed into the tip portion 12 of the protruding M10 bolt through a washer 32.

The breaking torque strength was determined by fastening a nut until the M10 bolt was broken, using a torque wrench provided with a load cell for measuring a fastening torque and an amplifier for amplifying its output signal. That is, a fastening torque at the time, where the nut 4 causes slipping as a result of the breakage of the thread of the bolt, is read from an output value of the amplifier, and then the read numerical was taken as the screw fastening breaking torque strength of the bolt.

(3) Measurement of Tensile Breaking Strength of M10 Bolt

Figure 3:
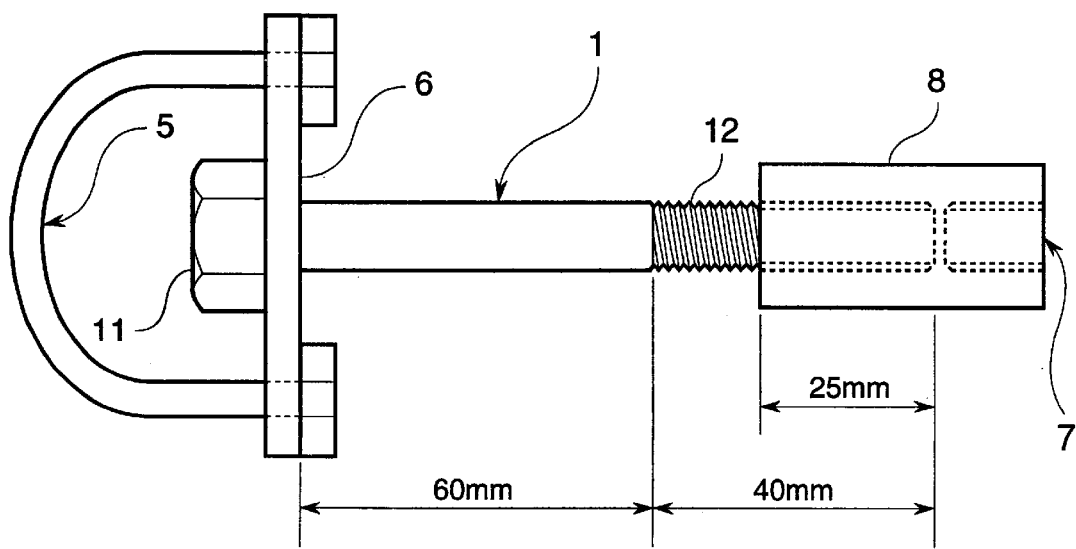
FIG. 3 is a partially schematic sectional view of a test jig used in the measurement of the tensile breaking strength of an M10 bolt in Examples and Comparative Examples.

The tensile breaking strength of an M10 bolt was measured by using a jig shown in FIG. 3. In FIG. 3, 5 is a U-bolt and this U-bolt is fastened to an iron plate 6 through a nut. The M10 bolt is inserted into a head portion insertion hole formed at the center portion of the iron plate 6 so that the head portion 11 positions at the center portion side of the U-bolt 5. On the other hand, an I-bolt 7 is fixed to the thread 12 opposite to the head portion 11 of the M10 bolt through a high nut 8. In this case, the screw portion 25 mm of the bolt and the screw portion 15 mm of the eyebolt are screwed into the high nut 8.

The tensile breaking strength was measured by pulling the M10 bolt through the U-bolt 5 and eyebolt 7 at a stress rate of 5 mm/second.

(4) Evaluation of Presence/absence of Head Break-off Phenomenon of M10 Bolt on Breakage It was observed whether the head portion 11 of an M10 bolt is broken-off or not when the M10 bolt is broken by applying an excess torque of 200 kgf·cm. The observation results are shown by "Yes" or "No".

Example 1

(Production of Modified Polypropylene)

As shown in the following Table 1, 98.9% by weight of an unmodified polypropylene [propylene crystalline homopolymer; MFR (230° C., 21.2 N): 2.0 g/10 min., melting point: 160° C.) powder was mixed with 0.5% by weight of maleic anhydride as the modifier, 0.1% by weight of 1,3-bis(t-butylperoxyisopropyl)benzene as the organic peroxide and 0.5% by weight of calcium stearate as the lubricant in a Henschel mixer (trade name) with stirring to prepare a mixture (proportion of each component is by weight based on the composition).

This mixture was fed to a feed hopper of an extruder, melt-kneaded (temperature: 200° C.) and then extruded to form a strand, which was cut into a predetermined length to obtain a modified polypropylene pellet. The resulting pellet had MFR (230° C., 21.2 N) of 130 g/10 min. and a maleic anhydride grafting rate of 0.3%.

(Production of Long Fiber Reinforcement-containing Polypropylene Pellet)

A fixed amount of the modified propylene obtained as described above was fed through a feed hopper of a first extruder, melt-kneaded with sucking from a vent provided at the downstream side of an extrusion barrel and then continuously fed in an opening (disintegrating) impregnation vessel mounted at the downstream end of the extrusion barrel. On the other hand, a glass roving (average fiber diameter: 17 µm, number of integrated filaments: about 4000, for propylene having TEX yarn count 2310) was introduced into the opening impregnation vessel from the upstream side to the downstream side to conduct opening (disintegration), and the above molten resin was sufficiently penetrated into a gap between long fibers of the reinforcement as the opened (disintegrated) material of the glass roving to form a composite material of the modified polypropylene and the glass roving opened material, which were drawn from a shaping die of the opening impregnation vessel to form a long fiber reinforcement-containing strand, followed by cooling in a cooling water tank.

The resulting strand contained a long glass fiber reinforcement in the amount of 40% by weight based on the total weight. This strand was cut into pieces having an average length of about 10 mm, using a strand cutter, to produce a long fiber reinforcement-containing polypropylene pellet. The pellet length of the long fiber reinforcement in the long fiber reinforcement-containing polypropylene pellet was about 10 mm, which is almost the same as the average length of the long fiber reinforcement-containing polypropylene pellet.

(Production of Short Fiber Reinforcement-containing Polypropylene Pellet)

A fixed amount of the above modified polypropylene was fed from a first feed hopper (upstream feed opening) of a second extruder and, at the same time, a fixed amount of a short glass fiber reinforcement (chopped strand for polypropylene having an average fiber diameter of 13 µm and an average fiber length of 3 mm) was fed. The above two components were melt-kneaded with sucking from a vent provided at the downstream side of an extrusion barrel, and then a melt-kneaded material of the modified polypropylene and short glass fiber reinforcement was extruded to form a short fiber-reinforced strand, followed by cooling in a cooling water tank.

The resulting short fiber-reinforced strand contained 60% by weight of a modified polypropylene and 40% by weight of a short glass fiber reinforcement. This strand was cut into pieces having an average length of about 10 mm, using a strand cutter, to produce a short fiber reinforcement-containing polypropylene pellet. The average length of the short glass fiber reinforcement in the short fiber reinforcement-containing polypropylene pellet was about 0.5 mm.

(Production of Fiber Reinforcement-containing Polypropylene Composition)

50% by weight of the above long fiber reinforcement-containing polypropylene pellet was blended with 50% by weight of the short fiber reinforcement-containing polypropylene pellet in a tumbler mixer to obtain a fiber reinforcement-containing polypropylene composition (mixture of the long fiber reinforcement-containing polypropylene pellet and short fiber reinforcement-containing polypropylene pellet).

The amount of each component contained in this fiber reinforcement-containing polypropylene composition is as follows, as shown in Table 1. That is, the amount of the modified polypropylene was 60% by weight, the amount of the long fiber reinforcement was 20% by weight and the amount of the short fiber reinforcement was 20% by weight. In Table 1, "*1: MAH-PP" represents maleic anhydride-modified polypropylene.

(Production of Fiber Reinforcement-containing Polypropylene Molded Article)

A fiber reinforcement-containing polypropylene composition was charged in an extrusion molder to produce a bolt ("M10 bolt", outer diameter: 9.855 mm, thread height: 0.949 mm, minor diameter: 7.975 mm, thread pitch: 1.50 mm, thread angle: 60°) shown in FIG. 1.

The resulting bolts were subjected to the respective tests such as filling property of glass fiber into thread portion, screw fastening breaking torque strength, tensile breaking strength and presence/absence of head break-off phenomenon. The results are as follows, "A (good)", "124 kgf·cm/", "650 kgf" and "No", as shown in Table 1.

Figure 4:
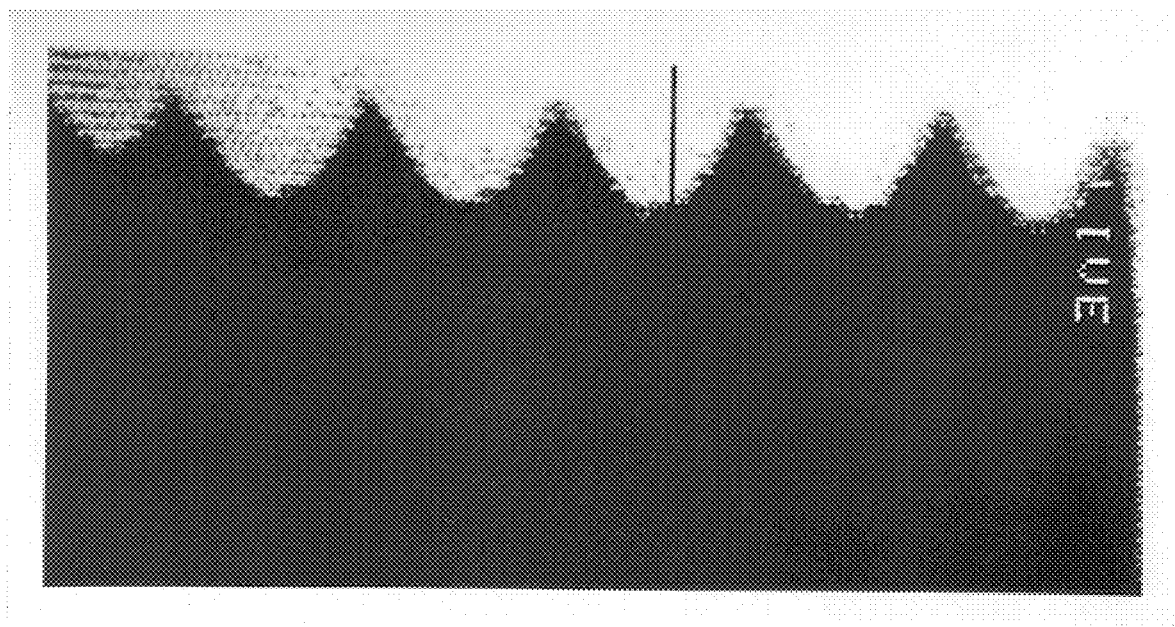
FIG. 4 is a partial soft X-ray image of the M10 bolt of FIG. 1 produced in Example 1.

A partially enlarged image of the resulting M10 bolt is shown in FIG. 4.

Example 2

A fiber reinforcement-containing composition was prepared in the same manner as that described in Example 1 except for changing the formulation of the long fiber reinforcement-containing polypropylene pellet and short fiber reinforcement-containing polypropylene pellet so that 60% by weight of the modified polypropylene, 30% by weight of the long glass fiber reinforcement and 10% by weight of the short glass fiber reinforcement were contained in the fiber reinforcement-containing polypropylene composition, as shown in Table 1.

According to the same manner as that described in Example 1, an M10 bolt was produced from the resulting fiber reinforcement-containing polypropylene composition, and the bolt was subjected to the respective tests such as filling property of glass fiber into thread portion, screw fastening breaking torque strength, tensile breaking strength and the presence/absence of head break-off phenomenon. The results are as follows, "A (good)", "130 kgf·cm", "670 kgf" and "No", as shown in Table 1.

Example 3

A fiber reinforcement-containing composition was prepared in the same manner as that described in Example 1 except for changing the formulation of the long fiber reinforcement-containing polypropylene pellet and short fiber reinforcement-containing polypropylene pellet so that 60% by weight of the modified polypropylene, 36% by weight of the long glass fiber reinforcement and 4% by weight of the short glass fiber reinforcement were contained in the fiber reinforcement-containing polypropylene composition, as shown in Table 1.

According to the same manner as that described in Example 1, an M10 bolt was produced from the resulting fiber reinforcement-containing polypropylene composition, and the bolt was subjected to the respective tests such as filling property of glass fiber into thread portion, screw fastening breaking torque strength, tensile breaking strength and the presence/absence of head break-off phenomenon. The results are as follows, "A (good)", "115 kgf·cm", "690 kgf" and "No", as shown in Table 1.

Example 4

Long fiber reinforcement-containing polypropylene pellets and short fiber reinforcement-containing polypropylene pellets are prepared in the same manner as described in Example 1 except for using an ionomer (ethylene-zinc acrylate copolymer resin, MI (190° C., 21.2 N): 5.5 g/10 min., density: 0.94 g/cc, content of acrylic acid unit: 7% by weight) as the modified propylene.

A fiber reinforcement-containing polypropylene composition was prepared in the same manner as that described in Example 1 except for using the above long fiber reinforcement-containing polypropylene pellets and short fiber reinforcement-containing polypropylene pellets and changing the formulation of them so that 60% by weight of the ionomer, 37% by weight of the long glass fiber reinforcement and 3% by weight of the short glass fiber reinforcement were contained in the fiber reinforcement-containing polypropylene composition, as shown in Table 1.

According to the same manner as that described in Example 1, an M10 bolt was produced from the resulting fiber reinforcement-containing polypropylene composition, and the bolt was subjected to the respective tests such as filling property of glass fiber into thread portion, screw fastening breaking torque strength, tensile breaking strength and the presence/absence of head break-off phenomenon. The results are as follows, "A (good)", "110 kgf·cm", "695 kgf" and "No", as shown in Table 1.

Example 5

A fiber reinforcement-containing polypropylene composition was prepared in the same manner as that described in Example 1 except for changing the formulation of the long fiber reinforcement-containing polypropylene pellet and short fiber reinforcement-containing polypropylene pellet so that 60% by weight of the modified polypropylene, 38% by weight of the long glass fiber reinforcement and 2% by weight of the short glass fiber reinforcement were contained in the fiber reinforcement-containing polypropylene composition, as shown in Table 1.

According to the same manner as that described in Example 1, an M10 bolt was produced from the resulting fiber reinforcement-containing polypropylene composition, and the bolt was subjected to the respective tests such as filling property of glass fiber into thread portion, screw fastening breaking torque strength, tensile breaking strength and the presence/absence of head break-off phenomenon. The results are as follows, "B (slightly poor)", "100 kgf·cm", "700 kgf" and "No", as shown in Table 1.

Comparative Example 1

A fiber reinforcement-containing polypropylene composition was prepared in the same manner as that described in Example 1 except for using only the long fiber reinforcement-containing polypropylene pellet to change the formulation so that 60% by weight of the modified polypropylene and 40% by weight of the long glass fiber reinforcement were contained in the fiber reinforcement-containing polypropylene composition, as shown in Table 1.

According to the same manner as that described in Example 1, an M10 bolt was produced from the resulting fiber reinforcement-containing polypropylene composition, and the bolt was subjected to the respective tests such as filling property of glass fiber into thread portion, screw fastening breaking torque strength, tensile breaking strength and the presence/absence of head break-off phenomenon. The results are as follows, "C (poor)", "64 kgf·cm", "680 kgf" and "No", as shown in Table 1.

As is apparent from Table 1, the bolt containing no short glass fiber was inferior in filling property of thread tip portion and screw fastening breaking torque strength.

Figure 5:
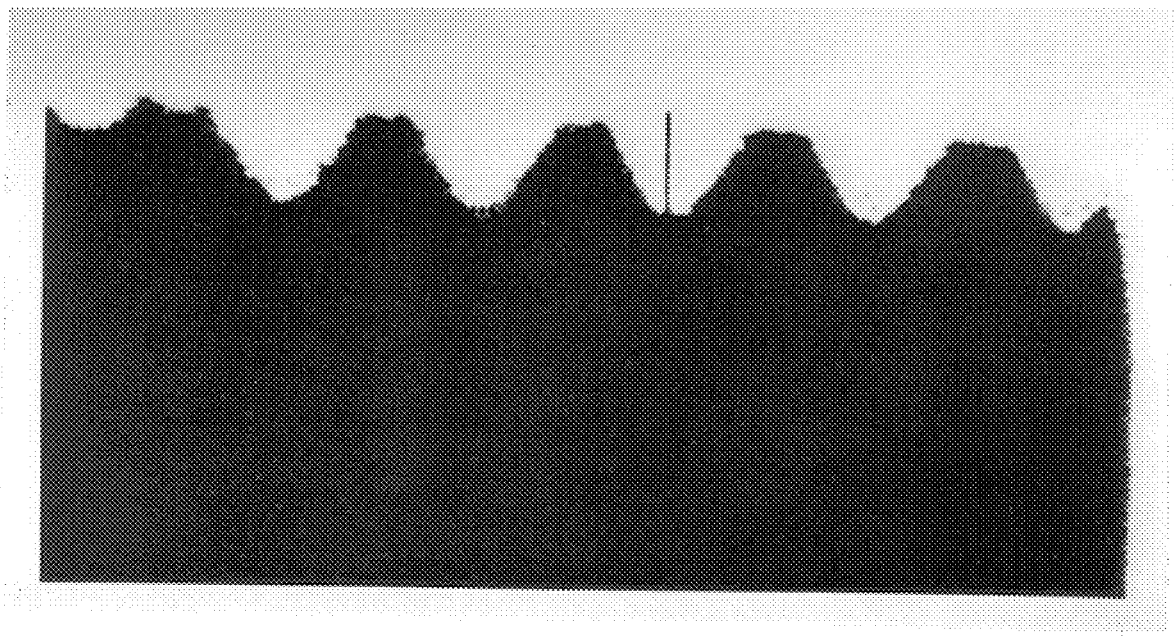
FIG. 5 is a partial soft X-ray image of the M10 bolt of FIG. 1 produced in Comparative Example 1.

A partially enlarged image of the resulting M10 bolt is shown in FIG. 5.

Comparative Example 2

A fiber reinforcement-containing polypropylene composition was prepared in the same manner as that described in Example 1 except for changing the formulation of the long fiber reinforcement-containing polypropylene pellet and short fiber reinforcement-containing polypropylene pellet so that 60% by weight of the modified polypropylene, 16% by weight of the long glass fiber reinforcement and 24% by weight of the short glass fiber reinforcement were contained in the fiber reinforcement-containing polypropylene composition, as shown in Table 1.

According to the same manner as that described in Example 1, an M10 bolt was produced from the resulting fiber reinforcement-containing polypropylene composition, and the bolt was subjected to the respective tests such as filling property of glass fiber into thread portion, screw fastening breaking torque strength, tensile breaking strength and the presence/absence of head break-off phenomenon. The results are as follows, "C (poor)", "66 kgf·cm", "460 kgf" and "Yes", as shown in Table 1.

As is apparent from Table 1, this bolt was inferior in screw fastening breaking torque strength and tensile strength, and bolt head break-off was recognized.

Comparative Example 3

A fiber reinforcement-containing polypropylene composition was prepared in the same manner as that described in Example 1 except for changing the formulation of the long fiber reinforcement-containing polypropylene pellet and short fiber reinforcement-containing polypropylene pellet so that 60% by weight of a modified polypropylene, 10% by weight of the long glass fiber reinforcement and 30% by weight of the short glass fiber reinforcement were contained in the fiber reinforcement-containing polypropylene composition, as shown in Table 1.

According to the same manner as that described in Example 1, an M10 bolt was produced from the resulting fiber reinforcement-containing polypropylene composition, and the bolt was subjected to the respective tests such as filling property of glass fiber into thread portion, screw fastening breaking torque strength, tensile breaking strength and the presence/absence of head break-off phenomenon. The results are as follows, "A (good)", "72 kgf·cm", "350 kgf" and "Yes", as shown in Table 1.

As is apparent from Table 1, this bolt was inferior in screw fastening breaking torque strength and tensile strength, and bolt head break-off was recognized.

Comparative Example 4

A fiber reinforcement-containing polypropylene composition was prepared in the same manner as that described in Example 1 except for using only the short glass fiber reinforcement-containing polypropylene pellet to change the formulation so that 60% by weight of the modified polypropylene and 40% by weight of the short glass fiber reinforcement were contained in the fiber reinforcement-containing polypropylene composition, as shown in Table 1.

According to the same manner as that described in Example 1, an M10 bolt was produced from the resulting fiber reinforcement-containing polypropylene composition, and the bolt was subjected to the respective tests such as filling property of glass fiber into thread portion, screw fastening breaking torque strength, tensile breaking strength and the presence/absence of head break-off phenomenon. The results are as follows, "A (good)", "68 kgf·cm", "270 kgf" and "Yes", it was recognized that as shown in Table 1.

As is apparent from Table 1, this bolt was inferior in screw fastening breaking torque strength and tensile strength, and bolt head break-off.

reinforcement-containing polyolefin composition comprising:

a polyolefin resin component comprising at least one modified polyolefin selected from the group consisting of a graft-modified polyolefin and an ionomer, the graft-modified polyolefin being prepared by modifying an unmodified polyolefin with at least one modifier selected from the group consisting of an organosilane compound, an unsaturated carboxylic acid, and an unsaturated carboxylic anhydride;

a long fiber reinforcement comprising long, nearly parallel fibers having an average fiber diameter of 3 to 21 μm, the long, nearly parallel fibers being arranged and dispersed in a pellet having a length of 3 to 30 mm prepared by molding the polyolefin resin component; and a short fiber reinforcement comprising short fibers having an average fiber length of 0.1 to 2 mm, the short fibers being randomly dispersed in the pellet wherein
the polyolefin resin component, the long fiber reinforcement, and the short fiber reinforcement are present in amounts of 20 to 90% by weight, 5 to 76% by weight, and 0.5 to 40% by weight, respectively;
the weight ratio of the long fiber reinforcement to the short fiber reinforcement is within the range from 1/1 to 19/1; and
the weight ratio of the polyolefin resin component to the total weight of the long fiber reinforcement and the short fiber reinforcement is within the range from 1/0.25 to 1/9.

TABLE 1

| | Formulation of structure | | | | Evaluation of performance of molded article | | | |
|---|---|---|---|---|---|---|---|---|
| | Base resin | | Glass fiber reinforcement | | | | | |
| | Kind | Content (wt %) | Long fiber | Short fiber | Weight ratio of long fiber to short fiber | Filling state of glass into tip of thread | Screw fastening breaking torque strength (kgf.cm) | Tensile strength of resin bolt (kgf) | Presence/ absence of head break-off phenomenon of resin bolt |
| Example No. | | | | | | | | | |
| 1 | MAH-PP | 60 | 20 | 20 | 1 | A | 124 | 650 | No |
| 2 | MAH-PP | 60 | 30 | 10 | 3 | A | 130 | 670 | No |
| 3 | MAH-PP | 60 | 36 | 4 | 9 | A | 115 | 690 | No |
| 4 | Ionomer | 60 | 37 | 3 | 12.3 | A | 110 | 695 | No |
| 5 | MAH-PP | 60 | 38 | 2 | 19 | B | 100 | 700 | No |
| Comparative Example No. | | | | | | | | | |
| 1 | MAH-PP | 60 | 40 | — | — | C | 64 | 680 | No |
| 2 | MAH-PP | 60 | 16 | 24 | 0.67 | A | 66 | 460 | Yes |
| 3 | MAH-PP | 60 | 10 | 30 | 0.33 | A | 72 | 350 | Yes |
| 4 | MAH-PP | 60 | — | 40 | — | A | 68 | 270 | Yes |

MAH-PP: Maleic anhydride-modified polypropylene; Ionomer: Ethylene-Zn acrylate copolymer resin

What is claimed is:

1. A fiber-reinforced resin molded article of a fiber reinforcement-containing polyolefin composition mainly comprising a long fiber reinforcement, a short fiber reinforcement, and a modified polyolefin, said molded article being prepared by injection-molding a fiber 2. A fiber-reinforced resin molded article comprising a bar-like body having a surface and a projection projecting from the surface for engagement with another body, the body mainly comprising a long fiber reinforcement, a short fiber reinforcement, and a modified polyolefin, the molded article being prepared by injection-molding a fiber reinforcement-containing polyolefin composition comprising:

a polyolefin resin component comprising at least one modified polyolefin selected from the group consisting of a graft-modified polyolefin and an ionomer, the graft-modified polyolefin being prepared by modifying an unmodified polyolefin with at least one modifier selected from the group consisting of an organosilane compound, an unsaturated carboxylic acid, and an unsaturated carboxylic anhydride;

a long fiber reinforcement comprising long, nearly parallel fibers having an average fiber diameter of 3 to 21 μm, the long, nearly parallel fibers being arranged and dispersed in a pellet having a length of 3 to 30 mm prepared by molding the polyolefin resin component; and a short fiber reinforcement comprising short fibers having an average fiber length of 0.1 to 2 mm, the short fibers being randomly dispersed in the pellet wherein the polyolefin resin component, the long fiber reinforcement, and the short fiber reinforcement are present in amounts of 20 to 90% by weight, 5 to 76% by weight, and 0.5 to 40% by weight, respectively;

the weight ratio of the long fiber reinforcement to the short fiber reinforcement is within the range from 1/1 to 19/1; and the weight ratio of the polyolefin resin component to the total weight of the long fiber reinforcement and the short fiber reinforcement is within the range from 1/0.25 to 1/9.

3. The fiber-reinforced resin molded article according to claim 2, wherein the projection for engagement is selected from the group consisting of a thread projection, a bayonet projection, an arcuate projection, a linear projection, a columnar projection, and a dot-shaped projection.

4. The fiber-reinforced resin molded article according to claim 3, comprising a single-end bolt, a double-end bolt, or a continuously threaded bolt wherein at least one end of the bar-like body includes a male screw thread.

* * * * *

UNITED STATES PATENT AND TRADEMARK OFFICE
CERTIFICATE OF CORRECTION

PATENT NO. : 6,284,831 B1
DATED : September 4, 2002
INVENTOR(S) : Shimpuku et al.

It is certified that error appears in the above-identified patent and that said Letters Patent is hereby corrected as shown below:

<u>Title page,</u>
Item [73], should read as follows:
-- [73]   Assignee: Chisso Corporation
               Osaka (JP) --

Signed and Sealed this

Fifth Day of November, 2002

Attest:

JAMES E. ROGAN
Attesting Officer    Director of the United States Patent and Trademark Office